(12) United States Patent
Wang et al.

(10) Patent No.: US 12,101,266 B2
(45) Date of Patent: **\*Sep. 24, 2024**

(54) REFERENCE SIGNAL TRANSMITTING AND RECEIVING METHOD, BASE STATION, TERMINAL, STORAGE MEDIUM, AND SYSTEM

(71) Applicant: SPREADTRUM COMMUNICATIONS (SHANGHAI) CO., LTD., Shanghai (CN)

(72) Inventors: Hualei Wang, Shanghai (CN); Xingya Shen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 921 days.

This patent is subject to a terminal disclaimer.

(21) Appl. No.: 16/321,645

(22) PCT Filed: Jan. 21, 2019

(86) PCT No.: PCT/CN2019/072476
§ 371 (c)(1),
(2) Date: Sep. 17, 2021

(87) PCT Pub. No.: WO2019/157906
PCT Pub. Date: Aug. 22, 2019

(65) Prior Publication Data
US 2022/0014323 A1    Jan. 13, 2022

(30) Foreign Application Priority Data

Feb. 13, 2018   (CN) .......................... 201810153252.6

(51) Int. Cl.
*H04W 4/00*       (2018.01)
*H04L 5/00*       (2006.01)
(Continued)

(52) U.S. Cl.
CPC .......... *H04L 5/0048* (2013.01); *H04W 72/12* (2013.01); *H04W 16/14* (2013.01)

(58) Field of Classification Search
CPC ............. H04W 72/0446; H04W 88/08; H04W 72/0453; H04W 24/00; H04W 72/12;
(Continued)

(56) References Cited

U.S. PATENT DOCUMENTS 11,943,724 B2 *   3/2024   Pan .......................... H04L 5/10
2017/0324499 A1  11/2017  Liao et al.
(Continued)

FOREIGN PATENT DOCUMENTS

CN    101500242    8/2009
CN    106162922    11/2016
(Continued)

OTHER PUBLICATIONS

CN 106411805 A, Zhao et al., 2017, English Machine Translation, FIT publisher, pp. 1-55 (Year: 2017).*
(Continued)

*Primary Examiner* — Phuongchau Ba Nguyen
(74) *Attorney, Agent, or Firm* — Occhiuti & Rohlicek LLP

(57) ABSTRACT

There is provided a method for transmitting a reference signal. The method for transmitting the reference signal includes: determining locations in time and frequency domains of a DRS, the DRS comprising at least one of a PSS, an SSS, a PBCH, a DMRS for PBCH, a CSI-RS for TRS, a CSI-RS for beam management, and a CSI-RS for acquiring channel state information; and transmitting the DRS at the determined locations in time and frequency domains of the DRS.

18 Claims, 4 Drawing Sheets

(51) Int. Cl.
*H04W 72/12* (2023.01)
*H04W 16/14* (2009.01)

(58) Field of Classification Search
CPC .............. H04W 16/14; H04W 56/0015; H04L 5/0007; H04L 5/0048; H04L 5/005; H04L 5/0078; H04B 7/06; H04B 7/0626
See application file for complete search history.

(56) References Cited

U.S. PATENT DOCUMENTS

| | | | |
|---|---|---|---|
| 2018/0027481 A1 | 1/2018 | Xu et al. | |
| 2019/0058533 A1* | 2/2019 | Ghosh | H04B 17/3912 |
| 2019/0059043 A1 | 2/2019 | Xue et al. | |
| 2019/0075524 A1* | 3/2019 | Zhou | H04W 72/046 |
| 2019/0306820 A1* | 10/2019 | Jiang | H04W 56/0015 |
| 2019/0306832 A1* | 10/2019 | Si | H04L 27/2666 |
| 2020/0154396 A1* | 5/2020 | Liu | H04L 5/0048 |
| 2020/0163052 A1* | 5/2020 | Ko | H04J 11/0079 |
| 2020/0366351 A1* | 11/2020 | Karjalainen | H04W 76/27 |
| 2022/0145324 A1* | 5/2022 | Cook | C12N 15/86 |
| 2022/0145837 A1* | 5/2022 | Shen | H04L 5/0023 |
| 2022/0248435 A1* | 8/2022 | Lin | H04W 72/1273 |
| 2023/0353310 A1* | 11/2023 | Xiao | H04J 11/0076 |

FOREIGN PATENT DOCUMENTS

| | | | | |
|---|---|---|---|---|
| CN | 106411805 A | * | 2/2017 | ............ H04W 16/14 |
| CN | 107135527 | | 9/2017 | |
| CN | 107659525 A | | 2/2018 | |
| CN | 107682133 A | | 2/2018 | |
| WO | 2014/067487 | | 5/2014 | |
| WO | 2017016216 A1 | | 2/2017 | |
| WO | WO-2021208977 A1 | * | 10/2021 | ......... H04L 27/2602 |

OTHER PUBLICATIONS

U.S. Appl. No. 16/321,654 Amendment filed Jan. 3, 2024, pp. 1-5 (Year: 2024).*
Chinese Office Action issued on Sep. 3, 2020 in CN Application No. 20181015325.6.
Chinese Office Action issued Feb. 3, 2020 in CN Application No. 201810153252.6.
*3GPP TSG RAN WG1 Meeting #79: Measurement and Synchronization for LAA-LTE.* San Francisco: HTC, Nov. 17-21, 2014.
PCT International Search Report, PCT/CN2019/072476, Apr. 19, 2019, 4 pgs.

* cited by examiner

REFERENCE SIGNAL TRANSMITTING AND RECEIVING METHOD, BASE STATION, TERMINAL, STORAGE MEDIUM, AND SYSTEM

CROSS-REFERENCE

This application is a U.S. national stage application of the PCT International Application No. PCT/CN2019/072476 filed on Jan. 21, 2019, which claims the priority of foreign priority of Chinese patent application No. 201810153252.6 filed on Feb. 13, 2018, the contents all of which are incorporated herein by reference.

TECHNICAL FIELD

Embodiment of the present disclosure relates to the technical field of communication system, in particular, to a method for transmitting a reference signal, a method for receiving the reference signal, a base station, a terminal, a storage medium, and a system.

BACKGROUND

As the radio technology develops constantly, 3GPP introduces a New Radio access technology (NR) to cope with the demands on a greater data amount and a smaller transmission time delay. NR is also known as the 5th-Generation mobile communication technology (5G).

To access an NR system, it is needed to have the user equipment (UE) synchronized with the base station (gNB) in time and frequency domains. Some Discovery Reference Signals (DRS) need to be configured in an unlicensed spectrum to help the UE to access the network. Synchronization signal and tracking signal are mainly required for the UE to access a network. The synchronization signal is used for the synchronization of the UE and the network in the time and frequency domains. The tracking signal helps the UE to synchronize with the network precisely for a long period in the time and frequency domains To facilitate the access of the UE to the network, and to acquire radio frame information, the reference signal needs to be configured as a periodic signal. In the unlicensed spectrum, all users compete for spectrum resource fairly, where a major technology is the Listen-Before-Talk (LBT). In the LBT, the UE occupies spectrum resources when the spectrum is idle. In order to ensure a continuous transmission of the reference signal, a tracking signal needs to be transmitted to occupy the spectrum.

SUMMARY

In the embodiments of the present disclosure, a method for transmitting the reference signal is provided. The method comprises determining locations in time and frequency domains of a Discovery Reference Signal (DRS), the DRS comprises at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information. The method further comprises transmitting the DRS at the determined locations in time and frequency domains of the DRS.

In the embodiments of the present disclosure there is provided a method for receiving the reference signal, comprising: acquiring locations in time and frequency domains of a DRS, the DRS comprising at least one of a PSS, an SSS, a PBCH, a DMRS for PBCH, a CSI-RS for TRS, a CSI-RS for beam management, and a CSI-RS for acquiring channel state information;

and receiving the DRS at the acquired locations in time and frequency domains of the DRS.

In the embodiments of the present disclosure there is provided a base station. The base station comprising a memory and a processor; the memory stores computer instructions executable on the processor to cause the processor to perform operations including: determining locations in time and frequency domains of a Discovery Reference Signal (DRS), the DRS comprising at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information; and transmitting the DRS at the determined locations in time and frequency domains of the DRS.

In the embodiments of the present disclosure there is provided a terminal. The terminal comprising a memory and a processor; the memory stores computer instructions executable on the processor to cause the processor to perform operations including: acquiring locations in time and frequency domains of a Discovery Reference Signal (DRS), the DRS comprising at least one of a Primary Synchronization Signal (PSS), a Secondary Synchronization Signal (SSS), a Physical Broadcast Channel (PBCH), a Demodulation Reference Signal (DMRS) for PBCH, a Channel State Information Reference Signal (CSI-RS) for Tracking Reference Signal (TRS), a CSI-RS for beam management, and a CSI-RS for acquiring channel state information; and receiving the DRS at the determined locations in time and frequency domains of the DRS.

DETAILED DESCRIPTION

Figure 1:
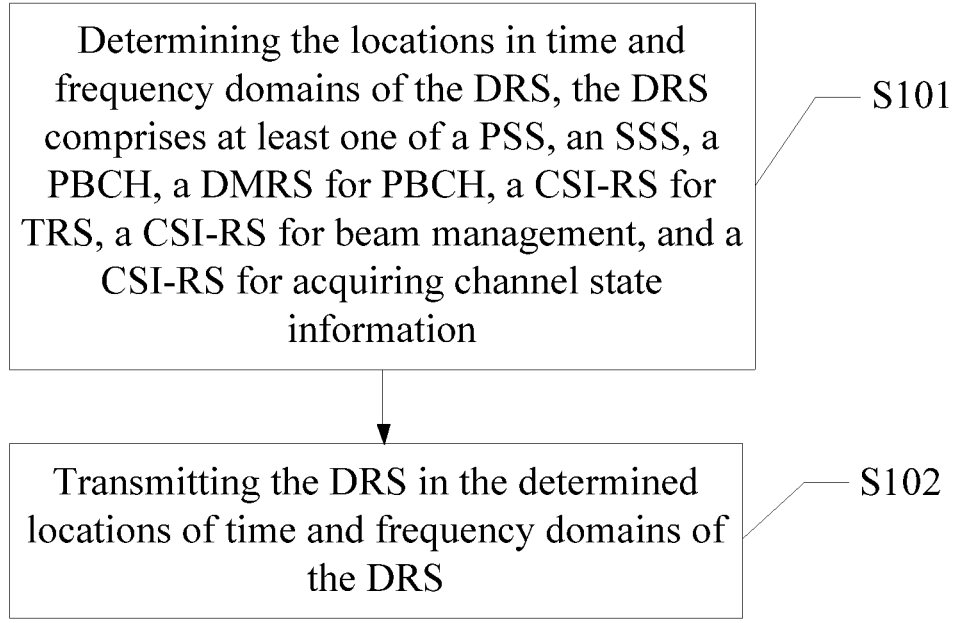
FIG. 1 is a flowchart of the method for transmitting reference signal according to an embodiment of the present disclosure.

3GPP has conducted a study of communications in unlicensed spectrum with cellular access, so as to improve communication services. By far, Enhanced Licensed Assisted Access (eLAA) and Licensed Assisted Access (LAA) based on LTE protocols have many new characteristics. With the evolution of communications technology, communications technology in unlicensed spectrum based on NR technology will become a new research hotspot.

During the process of 5G NR development, 3GPP Panel Session held in September, 2017 in Japan officially determined the specific research for unlicensed spectrum. Specifically, the research of 5G NR will be conducted for communications in wide bandwidth of 5 GHz, 37 GHz, 60 GHz and above. The scenarios of Dual Connectivity (DC) between NR LAA and legacy LTE carrier, Carrier Aggregation (CA) of 5G NR licensed carrier, and, further, standalone scenario completely based on NR LAA will be included in the research for 5G NR.

LTE LAA/eLAA provides the specific flow of DownLink (DL)/UpLink (UL) Channel Access, which essentially includes LBT. So far, LBT is one of the optimum known technologies to allow fair coexistence of devices using different communications technologies. The research of NR LAA will further develop new LBT technology based on NR such that NR LAA and the other technologies become good neighbors in unlicensed frequency spectrum.

Moreover, LTE LAA involves DRS for UE synchronization and channel measurement, etc. In LTE LAA, the DRS may include the Primary Synchronization Signal (PSS), the Secondary Synchronization Signal (SSS), etc., and may optionally include the Channel State Information Reference Signal (CSI-RS).

Inventors of the present disclosure note that the current NR system does not have reference signal configured for synchronization and access of unlicensed frequency spectrum. That is, time-frequency domain location of CSI-RS is not configured. This leads to relatively low accuracy of the reference signal reception from the transmitting end by the receiving end, which hinders the synchronization and channel access by the UE based on the DRS. Therefore, there is an urgent need of a reference signal for synchronization and access based on the unlicensed spectrum.

The technical problem which the present disclosure solves is to provide a method for transmitting the reference signal, a method for receiving the reference signal, a base station, a terminal, a storage medium, and a system, where the reference signal for synchronization and access can be determined based on the unlicensed spectrum, improving the accuracy of reference signal reception by a receiving end from a transmitting end, and facilitating the synchronization and channel access by the UE based on DRS.

The technical solutions of the embodiments according to the present disclosure have the following advantages.

In the embodiments of the present disclosure, the locations in time and frequency domains of the DRS are determined, where the DRS comprising at least one of a PSS, an SSS, a PBCH, a DMRS for PBCH, a CSI-RS for TRS, a CSI-RS for beam management, and a CSI-RS for acquiring channel state information, and the DRS is transmitted at the locations in time and frequency domains of the DRS. By such a technical solution, i.e., by determining locations in time and frequency domains of the DRS and by transmitting the DRS at the locations in time and frequency domains of the DRS, the location in time and frequency domains of the CSI-RS may be configured to determine a reference signal for synchronization and access based on the unlicensed spectrum, which improved the accuracy of reference signal reception by the receiving end from the transmitting end, and realizes the synchronization and channel access by the UE based on DRS.

To make the afore-mentioned objects, features and advantages of the present disclosure apparent and easy to understand, embodiments of the present disclosure are described below in detail with reference to the drawings.

Referring to FIG. 1, which is a flowchart of the method for transmitting reference signal according to an embodiment of the present disclosure. The method for transmitting reference signal may be used by a base station. The method may include S11 and S12.

In S11, the locations in time and frequency domains of the DRS are determined, the DRS comprising at least one of a PSS, an SSS, a PBCH, a DMRS for PBCH, a CSI-RS for TRS, a CSI-RS for beam management, and a CSI-RS for acquiring channel state information.

In S12, the DRS is transmitted at the determined locations in time and frequency domains of the DRS.

In an embodiment, in S11, the DRS may include several kinds of signals including at least one of, for example, the Primary Synchronization Signal (PSS), the Secondary Synchronization Signal (SSS), the Physical Broadcast Channel (PBCH), the Demodulation Reference Signal (DMRS) for PBCH, the Channel State Information Reference Signal (CSI-RS) for Tracking Reference Signal (TRS), the CSI-RS for beam management, and the CSI-RS for acquiring Channel State Information (CSI).

In a non-limiting example, in the NR LAA, the DRS may include the PSS and the SSS, may include the PSS, the SSS, and the CSI-RS, or may include the PSS, the SSS, the PBCH and the CSI-RS.

Further, the SSB includes the PSS, the SSS, the PBCH and the DMRS for PBCH of adjacent symbols, and the SSB and the CSI-RS meet a relationship that, in each time slot corresponding to the SSB, there is at least one CSI-RS resource.

Figure 2:
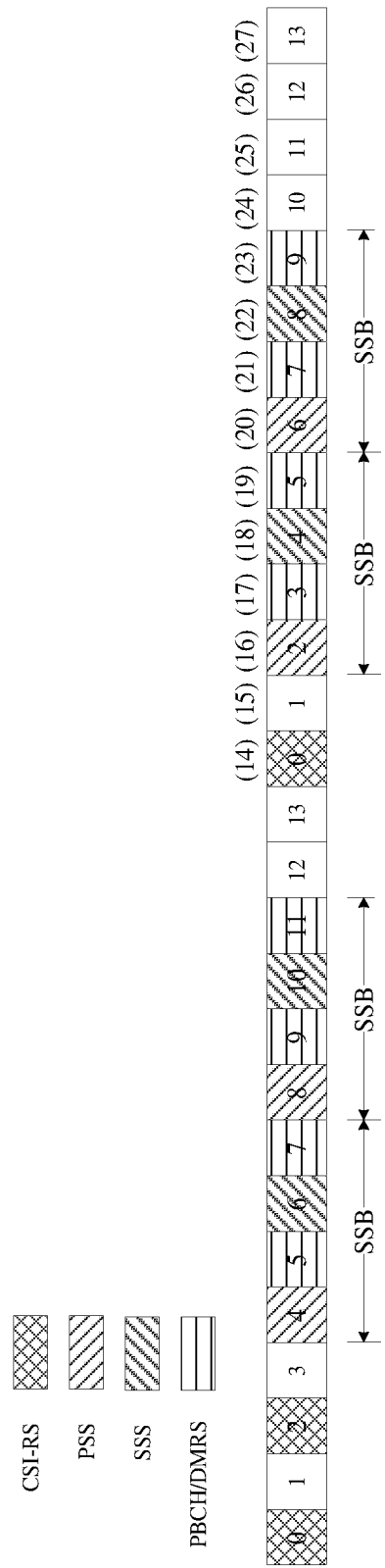
FIG. 2 is a schematic diagram of the distribution in time domain of the SS burst according to an embodiment of the present disclosure.

FIG. 2 is a schematic diagram of the distribution in time domain of the SS burst according to an embodiment of the present disclosure.

As shown in FIG. 2, the SS burst may include 2 time slots. The 2 time slots may include 4 SSBs.

In each time slot corresponding to the SSB, there is at least one CSI-RS resource, for the channel estimation, the beam management, the acquisition of tracking reference signal and the likes by the UE, so as to keep a precise synchronization with the base station in time and frequency domains Specifically, the first time slot includes the first 14 symbols, i.e., the zeroth symbol to the thirteenth symbol; and the second time slot includes the last 14 symbols.

It should be noted that the zeroth symbol is used to indicate the symbol with an index of 0, and the thirteenth symbol is used to indicate the symbol with an index of 13.

One skilled in the art may understand that the SS burst shown in FIG. 2 may be used when the subcarrier spacing (SCS) is 30 kHz.

Further, the CSI-RS for TRS is located in at least one of a zeroth symbol and a second symbol in each time slot of an SS burst.

In an embodiment of the present disclosure, the CSI-RS for TRS is located in a zeroth symbol or a second symbol in each time slot of an SS burst, so that the spectrum resource of a time slot can be occupied from the zeroth or the second symbol of that time slot. This helps for a continuous transmission of the reference signal, thereby realizing the synchronization between the transmitting end and the receiving end in time and frequency domains, which allows the UE to successfully access the NR network.

In an embodiment of the present disclosure, the CSI-RS for TRS is located in both the zeroth symbol and the second symbol in each time slot of an SS burst, so that the spectrum resource of a time slot can be occupied from the zeroth symbol, i.e. the starting symbol, of that time slot, and can further be occupied continuously by the CSI-RS for tracking in the second symbol. This enables a continuous transmission of the reference signal when the channel condition changes, thereby further realizing the synchronization between the transmitting end and the receiving end in time and frequency domains.

Further, the SSB may include the PSS, the SSS, the PBCH and the DMRS for PBCH. In an embodiment of the present disclosure, two SSBs in each time slot are continuous in time domain.

It should be noted that, in order to describe the signal in every two slots clearly, as shown in FIG. 2, in the second slot, the symbol with an index of 0 can marked as the fourteenth symbol; the symbol with an index of 1 can be marked as the fifteenth symbol, and so on, and the symbol with an index of 13 is marked as the twenty-seventh symbol.

The order in time domain of a plurality of reference signals in the SSB is: the PSS can be located in the starting symbol of each SSB; the SSS can be located later than the PSS with one symbol therebetween; and the PBCH can be located in the rest symbols of the SSB.

The PSS may be located in the fourth, the eighth, the sixteenth, and the twentieth symbols in every two time slots of the SS burst.

The SSS may be located in the sixth, the tenth, the eighteenth, and the twenty-second symbols in every two time slots of the SS burst.

In an exemplary embodiment of the present disclosure, the PBCH and the DMRS for PBCH are located in the fifth, the seventh, the ninth, and the eleventh, the seventeenth, the nineteenth, the twenty-first and the twenty-third symbols in every two time slots of the SS burst.

In another exemplary embodiment of the present disclosure, the PBCH and the DMRS for PBCH may be provided in the un-occupied zones in the symbols where the PSS and the SSS are located. Therefore, the PBCH and the DMRS for PBCH may also be located in all of the symbols where the SSB is located, i.e., in the fourth to the eleventh, and the sixteenth to the twenty-third symbols in every two time slots of the SS burst.

Further, the CSI-RS for beam management or the CSI-RS for acquiring channel state information may be located in at least one symbol in each time slot of the SS burst, wherein the CSI-RS for beam management or the CSI-RS for acquiring channel state information may be located in un-occupied symbols or multiplexed on a configured CSI-RS.

In an embodiment of the present disclosure, by configuring the CSI-RS for beam management or the CSI-RS for acquiring channel state information in at least one symbol of each time slot of the SS burst, the function of beam management and channel state information indication by the CSI-RS for can be effectively realized.

It should be noted that location in time domain of the SSB may be not limited to the locations defined in the embodiments of the present disclosure, but is indicated by the high-layer signaling.

Specifically, the location in time domain of the SSB can be indicated by the high-layer signaling; and the location in frequency domain of the SSB can be indicated by the high-layer signaling.

More specifically, the location in frequency domain of the SSB can be indicated by the high-layer signaling. The frequency domain location may be a center frequency of the SSB.

In an embodiment of the present disclosure, the center frequency is a Global Synchronization Channel Number (GSCN).

The indication by the high-layer signaling can be an offset of the center frequency of the SSB from a common Physical Resource Block (PRB) index 0.

The high-layer signaling may be transmitted to the user equipment by the base station. Specifically, the high-layer signaling may be carried in a Radio Resource Control (RRC) signaling, in a Remain Minimum System Information (RMSI), or in Other System Information (OSI).

Further, in an exemplary embodiment, the CSI-RS can have a frequency domain density of 3 and a location in frequency domain starting from a subcarrier 0 or a subcarrier N, wherein N is a natural number, and $0 \leq N \leq 11$.

In another exemplary embodiment, the CSI-RS can have a frequency domain density of 1 and a location in frequency domain starting from a subcarrier N, wherein N is a natural number, and $0 \leq N \leq 11$.

In another exemplary embodiment, the CSI-RS can have a frequency domain density of ½ and a location in frequency domain starting from a subcarrier N, wherein N is a natural number, and $0 \leq N \leq 23$.

The CSI-RS may be configured to be multi-port or single-port, for example, employing 1 port.

It should be noted that, the value of N may be indicated by the high-layer signaling.

In an embodiment of S12, the base station may transmit the DRS at the locations in time and frequency domains of the DRS.

In an embodiment of the present disclosure, by determining the locations in time and frequency domains of the DRS and by transmitting the DRS at the locations in time and frequency domains of the DRS, the location in time and frequency domains of the CSI-RS may be configured to determine a reference signal for synchronization and access based on the unlicensed spectrum. This helps to improve the accuracy of reference signal reception by the receiving end from the transmitting end, and facilitates the synchronization and channel access by the UE based on DRS.

In an embodiment of the present disclosure, the described SS burst may also be a time window measured in the unit of time slots or milliseconds.

In an embodiment, the time window is periodic with a predefined period.

In an embodiment, the time window is periodic with a period specified by the RRC signaling.

In an embodiment, the time window is non-periodic; and location of the time window is assigned by the RRC signaling.

Figure 3:
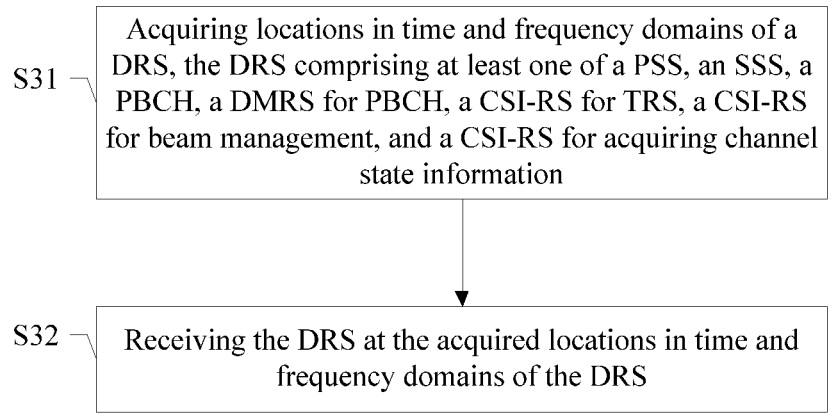
FIG. 3 is a flowchart of the method for receiving reference signal according to an embodiment of the present disclosure.

FIG. 3 is a flowchart of the method for receiving reference signal according to an embodiment of the present disclosure. As shown in FIG. 3, the method for receiving reference signal may be used by a user equipment. The method may include S31 and S32.

In S31, the locations in time and frequency domains of the DRS are acquired, the DRS comprising at least one of a PSS, an SSS, a PBCH, a DMRS for PBCH, a CSI-RS for TRS, a CSI-RS for beam management, and a CSI-RS for acquiring channel state information.

In S32, the DRS is received at the acquired locations in time and frequency domains of the DRS.

Further, the SSB may include the PSS, the SSS, the PBCH and the DMRS for PBCH of adjacent symbols, and the SSB and the CSI-RS meet a relationship that, in each time slot corresponding to the SSB, there is at least one CSI-RS resource.

The CSI-RS for TRS may be located in at least one of a zeroth symbol and a second symbol in each time slot of an SS burst.

The PSS may be located in fourth, eighth, sixteenth, and twentieth symbols in every two time slots of an SS burst.

The SSS is located in sixth, tenth, eighteenth, and twenty-second symbols in every two time slots of an SS burst.

The PBCH and the DMRS for PBCH can be located in the fifth, seventh, ninth, eleventh, seventeenth, nineteenth, twenty-first, and twenty-third symbols in every two time slots of an SS burst.

The PBCH and the DMRS for PBCH are located in the fourth to eleventh symbols and the sixteenth to twenty-third symbols in every two time slots of an SS burst.

The CSI-RS for beam management or the CSI-RS for acquiring channel state information can be located in at least one symbol in each time slot of an SS burst.

The CSI-RS may have a frequency domain density of 3 and a location in frequency domain starting from a subcarrier 0 or a subcarrier N, wherein N is a natural number, and $0 \leq N \leq 11$.

The CSI-RS may have a frequency domain density of 1 and a location in frequency domain starting from a subcarrier 0 or a subcarrier N, wherein N is a natural number, and $0 \leq N \leq 11$.

The CSI-RS may have a frequency domain density of ½ and a location in frequency domain starting from a subcarrier 0 or a subcarrier N, wherein N is a natural number, and $0 \leq N \leq 23$.

Further, the method for transmitting reference signal may further comprise indicating a value of N by the high-layer signaling.

The method for transmitting reference signal may further comprise indicating a location in time domain of the SSB by the high-layer signaling; and indicating a location in frequency domain of the SSB by the high-layer signaling.

The location in frequency domain includes a center frequency corresponding to the SSB.

In an embodiment of the present disclosure, the center frequency is a Global Synchronization Channel Number (GSCN).

The high-layer signaling may include offset information of the center frequency corresponding to the SSB from a common PRB index 0.

In an embodiment, more details in S31 to S32 are executed by taking reference to the descriptions of S11 to S12 shown in FIG. 1, which will not be repeated herein.

Figure 4:
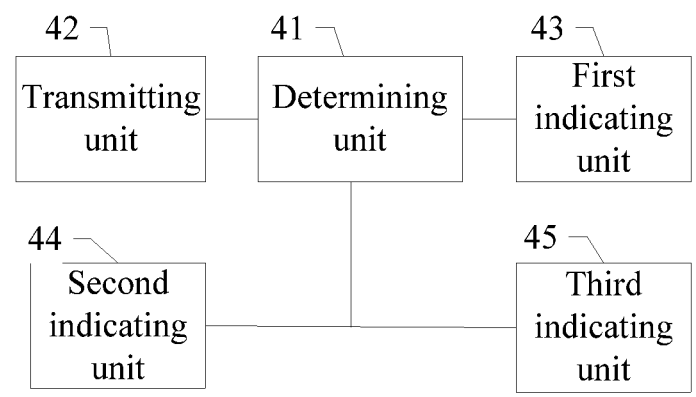
FIG. 4 is a structural diagram of the base station according to an embodiment of the present disclosure.

FIG. 4 is a structural diagram of the base station according to an embodiment of the present disclosure. As shown in FIG. 4, the base station may include a determining unit 41 and a transmitting unit 42.

The determining unit 41 is adapted to determine locations in time and frequency domains of a DRS, the DRS comprising at least one of a PSS, an SSS, a PBCH, a DMRS for PBCH, a CSI-RS for TRS, a CSI-RS for beam management, and a CSI-RS for acquiring channel state information.

The transmitting unit 42 is adapted to transmit the DRS at the determined locations in time and frequency domains of the DRS.

Further, the SSB may comprise the PSS, the SSS, the PBCH and the DMRS for PBCH of adjacent symbols, and the SSB and the CSI-RS meet a relationship that, in each time slot corresponding to the SSB, there is at least one CSI-RS resource.

The CSI-RS for TRS may be located in at least one of a zeroth symbol and a second symbol in each time slot of an SS burst.

The CSI-RS for beam management or the CSI-RS for acquiring channel state information can be located in at least one symbol in each time slot of an SS burst.

Further, the CSI-RS may have a frequency domain density of 3 and a location in frequency domain starting from a subcarrier 0 or a subcarrier N, wherein N is a natural number, and $0 \leq N \leq 11$.

The CSI-RS may have a frequency domain density of 1 and a location in frequency domain starting from a subcarrier 0 or a subcarrier N, wherein N is a natural number, and $0 \leq N \leq 11$.

The CSI-RS may have a frequency domain density of ½ and a location in frequency domain starting from a subcarrier 0 or a subcarrier N, wherein N is a natural number, and $0 \leq N \leq 23$.

Further, the base station may further comprise a first indicating unit 43, a second indicating unit 44, and a third indicating unit 45, wherein
- the first indicating unit 43 is adapted to indicate a value of N by the high-layer signaling,
- the second indicating unit 44 is adapted to indicate the location in time domain of the SSB by the high-layer signaling,
- the third indicating unit 45 is adapted to indicate the location in frequency domain of the SSB by the high-layer signaling.

Further, the location in frequency domain may include a center frequency corresponding to the SSB.

In an embodiment of the present disclosure, the center frequency is a Global Synchronization Channel Number (GSCN).

The high-layer signaling may include offset information of the center frequency corresponding to the SSB from a common PRB index 0.

The descriptions on the method for transmitting reference signal with reference to FIGS. 1 and 2 can be referred to for the working principles, implementations, and advantages of the base station, which will not be repeated herein.

Figure 5:
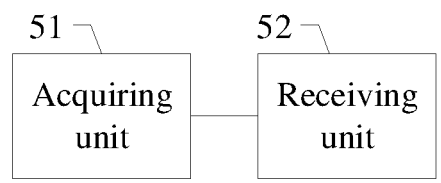
FIG. 5 is a structural diagram of the terminal according to an embodiment of the present disclosure.

FIG. 5 is a structural diagram of the terminal according to an embodiment of the present disclosure. The terminal may comprise:
- an acquiring unit 51 adapted to acquire locations in time and frequency domains of a DRS, the DRS comprising at least one of a PSS, an SSS, a PBCH, a DMRS for PBCH, a CSI-RS for TRS, a CSI-RS for beam management, and a CSI-RS for acquiring channel state information;
- a receiving unit 52 adapted to receive the DRS at the acquired locations in time and frequency domains of the DRS.

Further, the SSB may comprise the PSS, the SSS, the PBCH and the DMRS for PBCH of adjacent symbols, and the SSB and the CSI-RS meet a relationship that, in each time slot corresponding to the SSB, there is at least one CSI-RS resource.

The CSI-RS for TRS may be located in at least one of a zeroth symbol and a second symbol in each time slot of an SS burst.

The CSI-RS for beam management or the CSI-RS for acquiring channel state information is located in at least one symbol in each time slot of an SS burst.

The descriptions on the method for receiving reference signal with reference to FIG. 3 can be referred to for the working principles, implementations, and advantages of the user terminal, which will not be repeated herein.

According to embodiments of the present disclosure, there is further provided a storage medium storing computer instructions, wherein when executed the computer instructions perform steps of the steps of the method for transmitting reference signal as shown in FIGS. 1 and 2 or the steps in the method for receiving reference signal shown in FIG. 3. The storage medium may be a computer readable storage medium, for example, the storage medium may include a non-volatile memory or a non-transitory memory, and may also include an optical disk, a hard disk drive, a solid state disk, etc.

According to embodiments of the present disclosure, there is further provided a system comprising a memory and a processor, the memory storing computer instructions executable on the processor, wherein the processor is configured, when the computer instructions are executed, to perform the steps of the method for transmitting reference signal shown in FIGS. 1 and 2 or the steps of the method for receiving reference signal shown in FIG. 3.

Although the embodiments of the present disclosure have been described above, the present disclosure is not limited thereto. A number of variations and modifications may occur to one skilled in the art without departing from the scopes and spirits of the present disclosure. Therefore, it is intended that the scope of protection of the present disclosure is defined by the claims.

What is claimed is:

1. A method for transmitting a reference signal by a base station, comprising:
   determining locations in time and frequency domains of a Discovery Reference Signal (DRS), the DRS comprising a Physical Broadcast Channel (PBCH) and a Demodulation Reference Signal (DMRS) for PBCH, or the DRS comprising the PBCH, the DMRS for PBCH and at least one of a Primary Synchronization Signal (PSS), a Secondary Synchronization Signal (SSS), a Channel State Information Reference Signal (CSI-RS) for Tracking Reference Signal (TRS), a CSI-RS for beam management, and a CSI-RS for acquiring channel state information; and
   transmitting the DRS at the determined locations in time and frequency domains of the DRS,
   wherein the PBCH and the DMRS for PBCH are provided in the un-occupied zones in the symbols where the PSS and the SSS are located,
   wherein the PSS is located in fourth, eighth, sixteenth, and twentieth symbols in every two time slots of a Synchronization Signal burst (SS burst),
   wherein the SSS is located in sixth, tenth, eighteenth, and twenty-second symbols in every two time slots of a Synchronization Signal burst (SS burst).

2. The method according to claim 1, wherein at least one the CSI-RS is present in each time slot corresponding to a Synchronization Signal block (SSB), and the SSB includes the PSS, the SSS, the PBCH and the DMRS for PBCH of adjacent symbols.

3. The method according to claim 2, wherein the CSI-RS for TRS is located in at least one of a zeroth symbol and a second symbol in each time slot of a Synchronization Signal burst (SS burst).

4. The method according to claim 2, wherein the PBCH and the DMRS for PBCH are located in the fifth, seventh, ninth, eleventh, seventeenth, nineteenth, twenty-first, and twenty-third symbols in every two time slots of a Synchronization Signal burst (SS burst).

5. The method according to claim 2, wherein the PBCH and the DMRS for PBCH are located in fourth to eleventh symbols and sixteenth to twenty-third symbols in every two time slots of a Synchronization Signal burst (SS burst).

6. The method according to claim 2, wherein the CSI-RS for beam management or the CSI-RS for acquiring channel state information is located in at least one symbol in each time slot of a Synchronization Signal burst (SS burst).

7. The method according to claim 2, wherein the CSI-RS has a frequency domain density of 1 and a location in frequency domain starting from a subcarrier 0 or a subcarrier N, wherein N is a natural number, and $0 \leq N \leq 11$.

8. The method according to claim 2, wherein the CSI-RS has a frequency domain density of ½ and a location in frequency domain starting from a subcarrier 0 or a subcarrier N, wherein N is a natural number, and $0 \leq N \leq 23$.

9. The method according to claim 2, comprising:
   indicating a location in time domain of the SSB by high-layer signaling; and
   indicating a location in frequency domain of the SSB by the high-layer signaling.

10. The method according to claim 2, wherein the CSI-RS has a frequency domain density of 3 and a location in frequency domain starting from a subcarrier 0 or a subcarrier N, wherein N is a natural number, and $0 \leq N \leq 11$.

11. The method according to claim 10, further comprising:
    indicating a value of N by high-layer signaling.

12. The method according to claim 11, the location in frequency domain includes a center frequency corresponding to the SSB.

13. The method according to claim 12, wherein the high-layer signaling includes offset information of the center frequency corresponding to the SSB from a common Physical Resource Block (PRB) index 0.

14. A base station, comprising a memory and a processor, the memory storing computer instructions causing the processor to:
    determine locations in time and frequency domains of a Discovery Reference Signal (DRS), the DRS comprising a Physical Broadcast Channel (PBCH) and a Demodulation Reference Signal (DMRS) for PBCH, or the DRS comprising the PBCH, the DMRS for PBCH and at least one of a Primary Synchronization Signal (PSS), a Secondary Synchronization Signal (SSS), a Channel State Information Reference Signal (CSI-RS) for Tracking Reference Signal (TRS), a CSI-RS for beam management, and a CSI-RS for acquiring channel state information; and
    transmit the DRS at the determined locations in time and frequency domains of the DRS,
    wherein the PBCH and the DMRS for PBCH are provided in the un-occupied zones in the symbols where the PSS and the SSS are located,
    wherein the PSS is located in fourth, eighth, sixteenth, and twentieth symbols in every two time slots of a Synchronization Signal burst (SS burst),
    wherein the SSS is located in sixth, tenth, eighteenth, and twenty-second symbols in every two time slots of a Synchronization Signal burst (SS burst).

15. The base station according to claim 14, wherein at least one the CSI-RS is present in each time slot corresponding to a Synchronization Signal block (SSB), and the SSB includes the PSS, the SSS, the PBCH and the DMRS for PBCH of adjacent symbols.

16. The base station according to claim 15, wherein the CSI-RS for TRS is located in at least one of a zeroth symbol and a second symbol in each time slot of a Synchronization Signal burst (SS burst).

17. The base station according to claim 15, wherein the CSI-RS for beam management or the CSI-RS for acquiring channel state information is located in at least one symbol in each time slot of a Synchronization Signal burst (SS burst).

18. A non-transitory storage medium storing computer instructions, wherein the computer instructions cause a processor to:
- determine locations in time and frequency domains of a Discovery Reference Signal (DRS), the DRS comprising a Physical Broadcast Channel (PBCH) and a Demodulation Reference Signal (DMRS) for PBCH, or the DRS comprising the PBCH, the DMRS for PBCH and at least one of a Primary Synchronization Signal (PSS), a Secondary Synchronization Signal (SSS), a Channel State Information Reference Signal (CSI-RS) for Tracking Reference Signal (TRS), a CSI-RS for beam management, and a CSI-RS for acquiring channel state information; and
- transmit the DRS at the determined locations in time and frequency domains of the DRS,
- wherein the PBCH and the DMRS for PBCH are provided in the un-occupied zones in the symbols where the PSS and the SSS are located,
- wherein the PSS is located in fourth, eighth, sixteenth, and twentieth symbols in every two time slots of a Synchronization Signal burst (SS burst),
- wherein the SSS is located in sixth, tenth, eighteenth, and twenty-second symbols in every two time slots of a Synchronization Signal burst (SS burst).

* * * * *